(12) United States Patent
Suzuki

(10) Patent No.: US 8,477,339 B2
(45) Date of Patent: Jul. 2, 2013

(54) IMAGE PROCESSING APPARATUS, METHOD, AND COMPUTER-READABLE MEDIUM, IN WHICH DATA IS COMPRESSED ACCORDING TO A LOSSLESS OR LOSSY COMPRESSION METHOD

(75) Inventor: Takayuki Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1453 days.

(21) Appl. No.: 12/106,525

(22) Filed: Apr. 21, 2008

(65) Prior Publication Data
US 2008/0266599 A1 Oct. 30, 2008

(30) Foreign Application Priority Data

Apr. 27, 2007 (JP) ................... 2007-119615

(51) Int. Cl.
*G06F 3/12* (2006.01)
(52) U.S. Cl.
USPC ...................................................... 358/1.15
(58) Field of Classification Search
None
See application file for complete search history.

(56) References Cited

U.S. PATENT DOCUMENTS

| 5,479,587 | A * | 12/1995 | Campbell et al. | 358/1.17 |
| 6,181,435 | B1 | 1/2001 | Onodera | 358/1.14 |
| 6,519,052 | B1 * | 2/2003 | Oneda et al. | 358/1.16 |
| 2004/0184081 | A1 * | 9/2004 | Yamamoto | 358/1.15 |
| 2005/0179939 | A1 * | 8/2005 | Kunihiro | 358/1.15 |
| 2006/0274331 | A1 * | 12/2006 | Kawasaki | 358/1.1 |
| 2007/0098283 | A1 * | 5/2007 | Kim et al. | 382/239 |

FOREIGN PATENT DOCUMENTS

| JP | 10-023271 A | 1/1998 |
| JP | 11-259243 A | 9/1999 |
| JP | 11-348247 A | 12/1999 |
| JP | 2001-219566 A | 8/2001 |
| JP | 2003-241951 A | 8/2003 |
| JP | 2005-215954 A | 8/2005 |
| JP | 2005-244933 A | 9/2005 |

* cited by examiner

*Primary Examiner* — Jeremiah Bryar
(74) *Attorney, Agent, or Firm* — Fitzpatrick, Cella, Harper & Scinto

(57) ABSTRACT

This invention determines a compression method of printing data in consideration of a printing operation halt time when a low-speed interface is used. An image processing apparatus of this invention, which is connected to a printing apparatus, compresses printing data, and outputs the compressed printing data, determines the interface type, acquires a print waiting time, and determines the compression method of printing data based on the determined interface type and the acquired print waiting time. The image processing apparatus compresses printing data using the determined compression method, and outputs the compressed printing data to the printing apparatus.

13 Claims, 14 Drawing Sheets

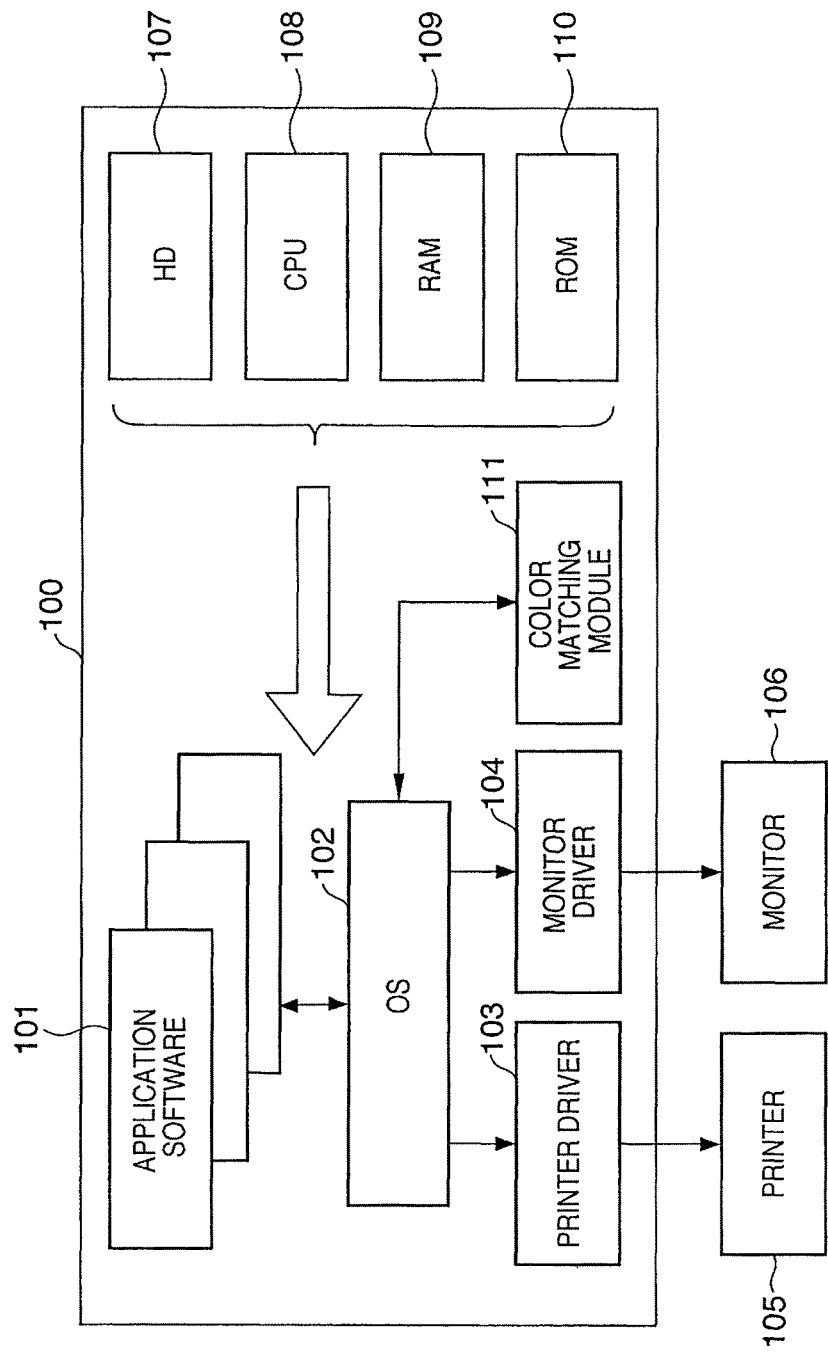

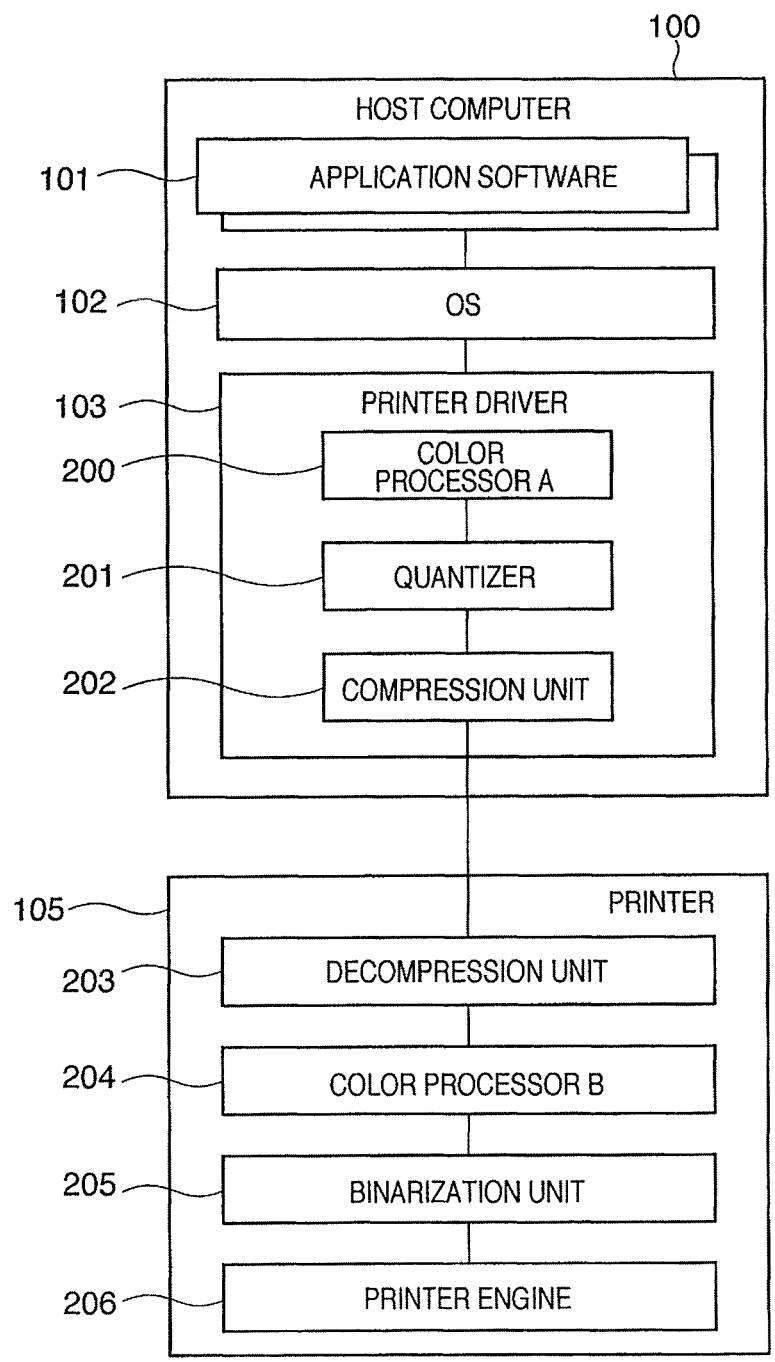

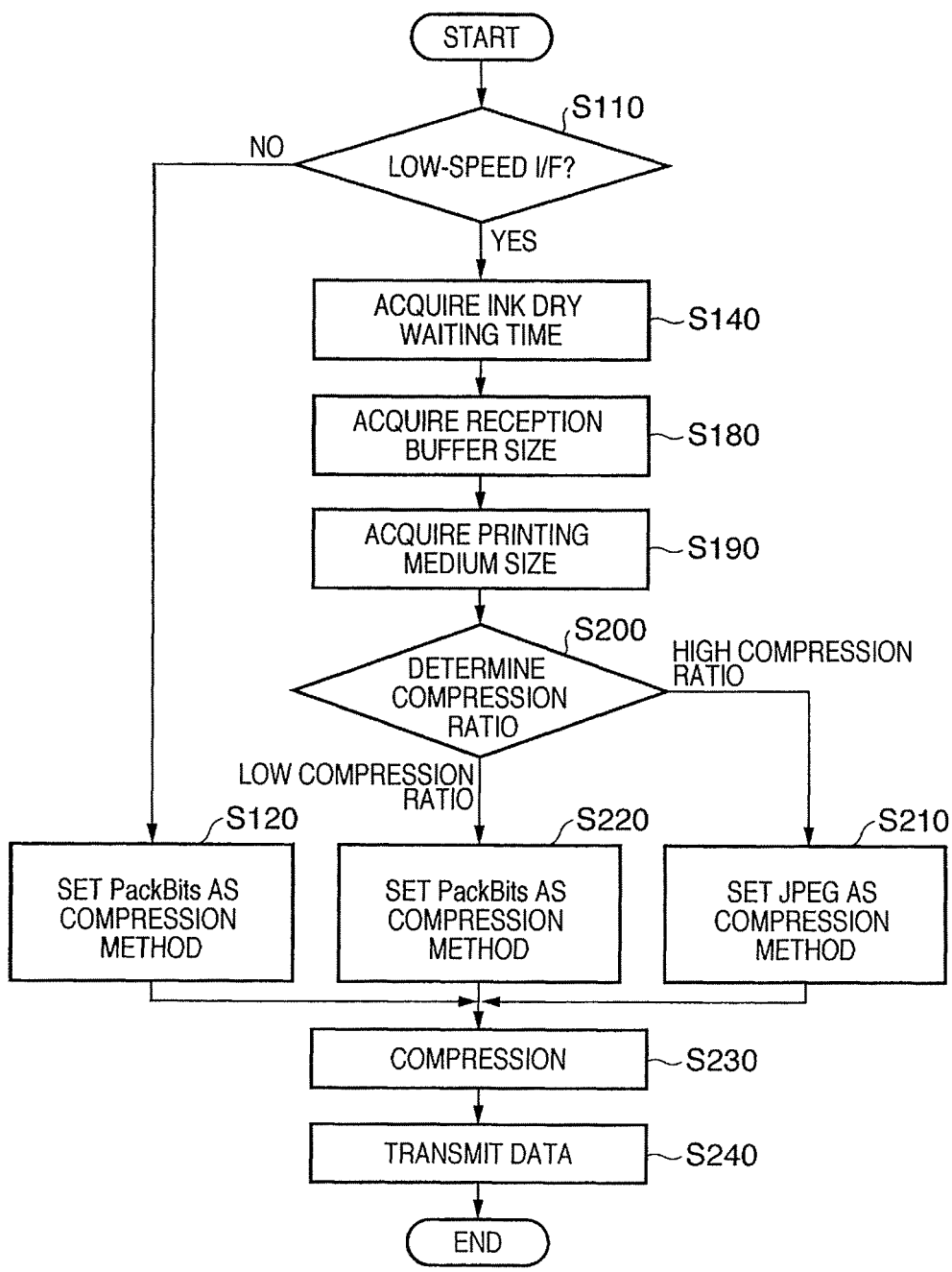

FIG. 5

| TYPE OF INTERFACE | CLASSIFICATION OF TRANSFER SPEED |
|---|---|
| USB | HIGH SPEED |
| IrDA | LOW SPEED |
| Bluetooth | LOW SPEED |
| IEEE802.11a/b/g | LOW SPEED |
| IEEE1394 | HIGH SPEED |

FIG. 6

| TRANSFER MODE | CLASSIFICATION OF TRANSFER SPEED |
|---|---|
| USB FULL SPEED MODE | LOW SPEED |
| USB HIGH SPEED MODE | HIGH SPEED |

FIG. 8

| SETTING | INK DRY WAITING TIME |
|---|---|
| FIRST SETTING FROM LEFT | 0 SEC |
| SECOND SETTING FROM LEFT | 30 SEC |
| THIRD SETTING FROM LEFT | 60 SEC |
| FOURTH SETTING FROM LEFT | 90 SEC |
| FIFTH SETTING FROM LEFT | 120 SEC |

FIG. 9

| PRINTING MEDIUM SIZE \ INK DRY WAITING TIME | 0 SEC | 30 SEC | 60 SEC | 90 SEC | 120 SEC |
|---|---|---|---|---|---|
| A3 | H | H | H | H | H |
| A4 | H | H | H | H | H |
| A5 | H | H | H | H | H |
| POSTCARD (4 inch × 6 inch) | H | H | L | L | L |
| L SIZE (89 mm × 127 mm) | H | L | L | L | L |
| NAME CARD (55 mm × 91 mm) | H | L | L | L | L |

FIG. 10

| PRINTING MEDIUM SIZE \ INK DRY WAITING TIME | 0 SEC | 30 SEC | 60 SEC | 90 SEC | 120 SEC |
|---|---|---|---|---|---|
| A3 | H | H | H | H | H |
| A4 | H | H | H | H | H |
| A5 | H | H | H | L | L |
| POSTCARD (4 inch × 6 inch) | H | H | L | L | L |
| L SIZE (89 mm × 127 mm) | H | L | L | L | L |
| NAME CARD (55 mm × 91 mm) | H | L | L | L | L |

F I G. 14

| PAPER SIZE / RECEPTION BUFFER SIZE | LESS THAN N | N OR MORE |
|---|---|---|
| A3 | H | H |
| A4 | H | H |
| A5 | H | H |
| POSTCARD | H | L |
| L SIZE | L | L |
| NAME CARD | L | L |

IMAGE PROCESSING APPARATUS, METHOD, AND COMPUTER-READABLE MEDIUM, IN WHICH DATA IS COMPRESSED ACCORDING TO A LOSSLESS OR LOSSY COMPRESSION METHOD

BACKGROUND OF THE INVENTION

1. Field of the Invention

The present invention relates to an image processing apparatus connected to a printing apparatus which prints an image by discharging inks onto a printing medium according to image data, an image processing method, and a program and, more particularly, to an image processing apparatus having a plurality of different image data formats, an image processing method, and a program.

2. Description of the Related Art

In recent printing apparatus such as ink-jet printing apparatuses and the like, a printing time per page becomes dramatically shorter due to improved printing speeds. For this reason, printing data need to be transferred at high speed so as to speed up the overall printing processing. However, the data size of printing data is increasing due to higher-resolution and higher-quality images to be printed. For this reason, a printing apparatus has a high-speed interface such as USB (Universal Serial Bus) compatible to a High Speed mode, and the like. However, in some popular configurations, a printing apparatus is wirelessly connected using a low-speed interface such as Bluetooth™, IEEE802.11b, or the like in place of connecting the printing apparatus to a host computer by wire like the High Speed mode of USB. In another configuration, a host computer is connected to a printing apparatus via a low-speed interface such as a USB connection that is compatible to only a Full Speed mode, or the like, depending on the types of host computers.

Hence, as a method for shortening the transfer time of printing data even in the configuration using a low-speed interface, a method of determining a compression method of printing data based on the type of interface is available (see Japanese Patent Laid-Open No. 2005-215954). Also, a method of determining a compression method by dividing image data into a plurality of bands, and recognizing the type of image data in each band is available (see Japanese Patent Laid-Open No. H11-259243).

In general, a printing medium printed by an ink-jet printing apparatus is output before inks discharged on its printing medium surface dry, and is stacked on a paper output tray. In particular, upon printing using slow-fixing inks or printing media, when printing of the next page on a printing medium is immediately started, that printing medium is stacked on the paper output tray before the inks of the surface of a printing medium printed as the immediately preceding page dry. Hence, the printing medium printed as the next page may become tainted or an image printed on the printing medium of the previous page may become tainted. To solve this problem, a printing control apparatus which calculates an ink dry time of the printing medium printed as the immediately preceding page based on the type of printing medium, the type of inks, the ambient temperature, a printing mode, and the like, waits for the calculated ink dry time, and then starts a printing operation on the next printing medium is available (see Japanese Patent Laid-Open No. H11-348247).

A method of designating an ink dry time of a printed printing sheet, which is printed as the immediately preceding page, by a printer driver in a host computer connected to a printing apparatus is also available.

Furthermore, a printing control apparatus which periodically executes a maintenance function of a printing apparatus during printing processing so as to maintain high quality of printed images is available (see Japanese Patent Laid-Open No. 2003-241951).

In Japanese Patent Laid-Open No. 2005-215954 and Japanese Patent Laid-Open No. H11-259243 above, the printing processing time is shortened by reducing the size of printing data. However, as described in Japanese Patent Laid-Open No. H11-348247 above, when the printing apparatus waits for the ink dry time, printing data for the second and subsequent pages can be transmitted while the printing apparatus is waiting.

FIG. 3A is a timing chart showing an example in which printing data is transmitted while the printing apparatus is waiting for the ink dry time. A host computer 100 generates printing data by executing rasterize processing and compression processing. The host computer 100 then transmits the printing data to a printer 105. The printer 105 transmits a reception response to the received printing data to the host computer 100, and executes decompression processing of the received printing data. After that, the printer 105 executes printing processing.

Focusing on the operation after the decompression processing and printing processing for printing data of the first page, the printer 105 waits for the ink dry time (ink dry waiting) to let the ink on the printing medium of the first page dry. During this ink dry waiting, the printer 105 can receive printing data from the host computer 100. However, when the ink dry time is long, the printer 105 continues ink dry waiting by a time Td even after it has received all printing data of the second page, as shown in FIG. 3A.

For this reason, the case of FIG. 3A has no effect of shortening the time required for the printing processing of the second and subsequent pages even when the printing data transfer time is shortened by reducing the size of printing data. In addition, when lossy compression is used to reduce the size of printing data, there is no effect of shortening the time from the beginning to the end of the printing operation, and the quality of a printed image also drops.

A quality drop of a printed image is conspicuous when an image like a character having a sharp edge is printed on a printing medium. For example, an image processing apparatus which forms an image on a printing medium using dye and pigment inks may often suffer a quality drop of a printed image. More specifically, upon using lossless compression, a character part can be formed only pigment ink. However, upon using lossy compression, since image data after the decompression processing changes, a character may often be formed using dye ink. Since the dye ink permeates better into a printing medium than the pigment ink, a character using the dye ink suffers blurring on a printing medium compared to that formed using only the pigment ink. For this reason in particular, the quality of a character part formed using the dye ink drops.

SUMMARY OF THE INVENTION

The present invention is directed to an image processing apparatus, image processing method, and program.

The present invention has been made in consideration of the aforementioned problems, and has as its object to provide an image processing apparatus, image processing method, and program, which decide a compression method of printing data in consideration of a printing operation halt time when a low-speed interface is used.

According to one aspect of the present invention, preferably, there is provided an image processing apparatus, which is connected, via an interface, to a printing apparatus in which a print waiting time is assured from the beginning to the end of a printing operation, compresses printing data, and outputs the compressed printing data to the printing apparatus, the apparatus comprising:

a determination unit adapted to determine a type of the interface connected to the printing apparatus before output of the printing data;

an acquisition unit adapted to acquire the print waiting time;

a decision unit adapted to decide a compression method of the printing data in accordance with the type of the interface determined by the determination unit and the print waiting time acquired by the acquisition unit;

a compression unit adapted to compress the printing data by the compression method decided by the decision unit; and an output unit adapted to output the printing data compressed by the compression unit to the printing apparatus.

According to another aspect of the present invention, preferably, there is provided an image processing method of an image processing apparatus, which is connected, via an interface, to a printing apparatus in which a print waiting time is assured from the beginning to the end of a printing operation, compresses printing data, and outputs the compressed printing data to the printing apparatus, the method comprising:

a determination step of determining a type of the interface connected to the printing apparatus before output of the printing data;

an acquisition step of acquiring the print waiting time;

a decision step of deciding a compression method of the printing data in accordance with the type of the interface determined in the determination step and the print waiting time acquired in the acquisition step;

a compression step of compressing the printing data by the compression method decided in the decision step; and an output step of outputting the printing data compressed in the compression step to the printing apparatus.

According to still another aspect of the present invention, preferably, there is provided a program to be executed in an image processing apparatus, which is connected, via an interface, to a printing apparatus in which a print waiting time is assured from the beginning to the end of a printing operation, compresses printing data, and outputs the compressed printing data to the printing apparatus, the program making a computer execute:

determination processing for determining a type of the interface connected to the printing apparatus before output of the printing data;

acquisition processing for acquiring the print waiting time;

decision processing for deciding a compression method of the printing data in accordance with the type of the interface determined by the determination processing and the print waiting time acquired by the acquisition processing;

compression processing for compressing the printing data by the compression method decided by the decision processing; and output processing for outputting the printing data compressed by the compression processing to the printing apparatus.

The invention is particularly advantageous since an output result with high image quality can be obtained without prolonging the processing time for the second and subsequent pages by determining the compression method of printing data in consideration of an ink dry time when a low-speed interface is used.

Further features of the present invention will become apparent from the following description of exemplary embodiments with reference to the attached drawings.

BRIEF DESCRIPTION OF THE DRAWINGS

FIG. 1 is an exemplary block diagram showing the arrangement of a host computer which generates image data to be transmitted to an ink-jet printing apparatus;

FIG. 2 is an exemplary block diagram showing the arrangement of principal part required upon executing image processing;

FIG. 4 is a flowchart showing the image processing according to the first embodiment;

FIG. 5 shows an example of a table which classifies transfer speeds based the interface types;

FIG. 6 shows an example of a table which classifies transfer speeds based the transfer modes;

FIG. 8 shows an example of a table used to determine an ink dry waiting time;

FIG. 9 shows an example of a table used to decide the compression method of printing data when the reception buffer size of a printer is less than a prescribed value;

FIG. 10 shows an example of a table used to decide the compression method of printing data when the reception buffer size of a printer is equal to or larger than the prescribed value;

FIG. 14 shows an example of a table used to decide the compression method of printing data;

DESCRIPTION OF THE EMBODIMENTS

Preferred embodiments according to the present invention will be described in detail hereinafter with reference to the accompanying drawings.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink (e.g., can solidify or insolubilize a coloring agent contained in ink applied to the print medium).

Figure 15:
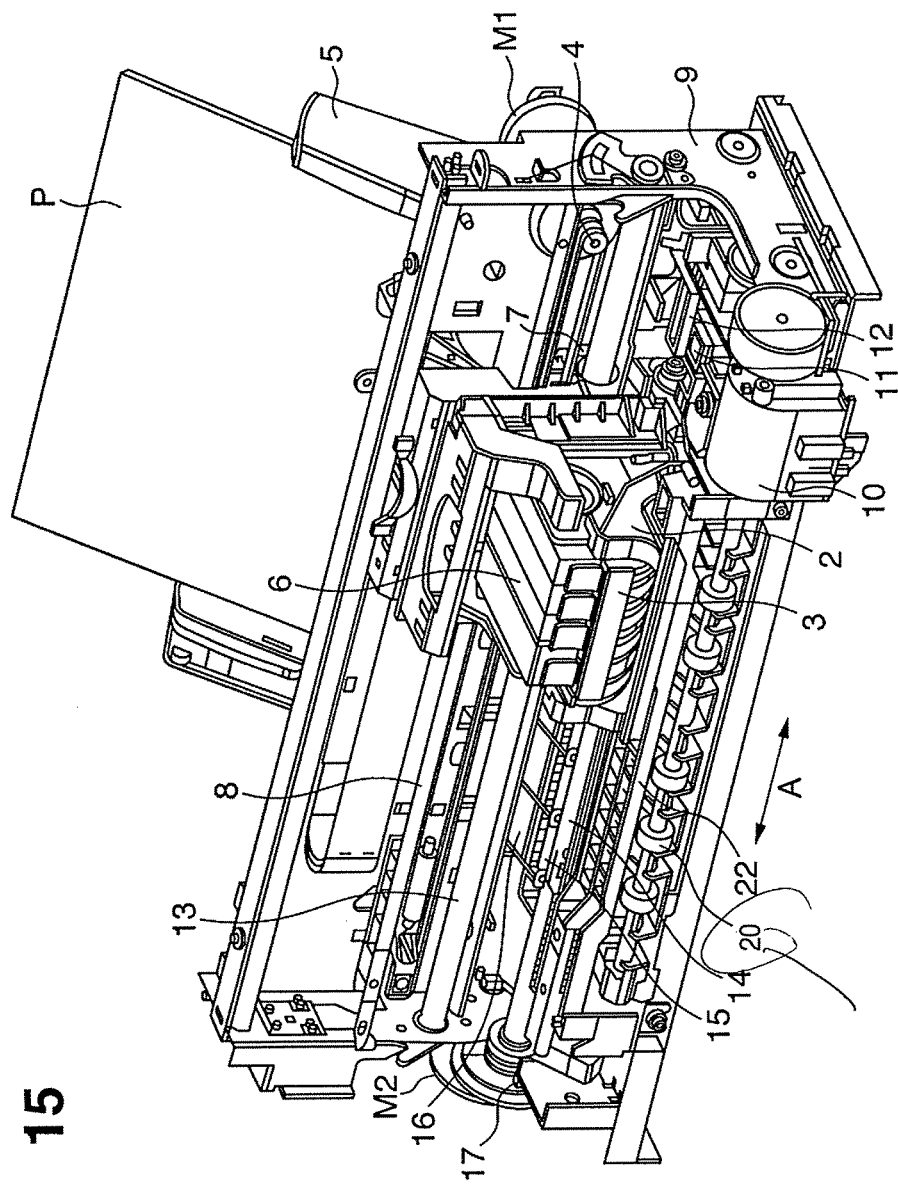
FIG. 15 is a perspective view of the outer appearance showing a schematic arrangement of an ink-jet printing apparatus as a typical embodiment of the present invention.

FIG. 15 is a perspective view of the outer appearance showing a schematic arrangement of an ink-jet printing apparatus as a typical embodiment of the present invention.

As shown in FIG. 15, in an ink-jet printing apparatus (to be also referred to as a printing apparatus hereinafter), a transfer mechanism 4 transfers a driving force generated by a carriage motor M1 to a carriage 2 which carries a printhead 3 for printing an image by discharging inks from nozzles according to an ink-jet scheme. Then, the carriage 2 is reciprocally moved in the directions of a double-headed arrow A. Simultaneously with the reciprocal movement, a printing medium P such as a printing sheet or the like is fed via a feeding mechanism 5, and is conveyed to a printing position. Furthermore, the printhead 3 discharges inks to the printing medium P, thus printing an image.

In order to maintain the printhead 3 in a satisfactory state, the carriage 2 is moved to the position of a recovery device 10 to intermittently execute discharge recovery processing of the printhead 3.

The carriage 2 of the printing apparatus not only carries the printhead 3, but also mounts ink cartridges 6 that contain inks to be supplied to the printhead 3. The ink cartridges 6 are detachable from the carriage 2.

The printing apparatus shown in FIG. 15 can print a color image. For this purpose, the carriage 2 mounts four ink cartridges which respectively contain magenta (M), cyan (C), yellow (Y), and black (K) inks. These four ink cartridges are independently detachable.

The carriage 2 and printhead 3 can attain and maintain a required electric connection when their joint surfaces are appropriately in contact with each other. The printhead 3 selectively discharges inks from a plurality of orifices by applying energy in accordance with a printing signal, thus printing an image. In particular, the printhead 3 of this embodiment adopts an ink-jet scheme that discharges inks using heat energy, and comprises an electrothermal transducer for generating heat energy. Electric energy applied to this electrothermal transducer is converted into heat energy. Using a change in pressure caused by growth and shrinkage of bubbles due to film boiling generated by applying this heat energy to inks, the printhead 3 discharges inks from orifices. The electrothermal transducer is arranged in correspondence with each orifice, and ink is discharged from a corresponding orifice by applying a pulse voltage to the corresponding electrothermal transducer in accordance with a printing signal.

As shown in FIG. 15, the carriage 2 is coupled to a part of a driving belt 7 of the transfer mechanism 4 for transferring the driving force of the carriage motor M1, and is guided and supported to be slidable in the directions of the arrow A along a guide shaft 13. Therefore, the carriage 2 is reciprocally moved along the guide shaft 13 in response to forward and reverse rotations of the carriage motor M1. A scale 8 is equipped along the moving direction of the carriage 2 (the directions of the arrow A) to indicate the position of the carriage 2. This embodiment uses, as the scale 8, a transparent PET film printed with black bars at required pitches. One end of the scale 8 is fixed to a chassis 9, and its other end is supported by a leaf spring (not shown).

The printing apparatus is provided with a platen (not shown) to oppose the orifice surface, formed with orifices (not shown), of the printhead 3, and the carriage 2 that carries the printhead 3 is reciprocally moved by the driving force of the carriage motor M1. Simultaneously with the reciprocal movement of the carriage 2, a printing signal is supplied to the printhead 3 to discharge inks, thus printing an image over the full width of the printing medium P conveyed on the platen.

Furthermore, in FIG. 15, reference numeral 14 denotes a conveyance roller which is driven by a conveyance motor M2 so as to convey the printing medium P; and 15, a pinch roller which brings the printing medium P into contact with the conveyance roller 14 by a spring (not shown). Reference numeral 16 denotes a pinch roller holder which rotatably supports the pinch roller 15; and 17, a conveyance roller gear fixed to one end of the conveyance roller 14. The conveyance roller 14 is driven by the rotation of the conveyance motor M2 transferred to the conveyance roller gear 17 via an intermediate gear (not shown).

Reference numeral 20 denotes an exhaust roller used to exhaust the printing medium P on which an image is formed by the printhead 3 to outside the printing apparatus. The exhaust roller 20 is driven by transferring the rotation of the conveyance motor M2. Note that the exhaust roller 20 is in contact with the printing medium P by a spur roller (not shown) which presses it by a spring (not shown). Reference numeral 22 denotes a spur holder which rotatably supports the spur roller.

Furthermore, the recovery device 10 used to recover the printhead 3 from a discharge failure is arranged at a desired position (e.g., a position corresponding to the home position) outside the reciprocal movement range (print area) for the printing operation of the carriage 2 that carries the printhead 3.

The recovery device 10 comprises a capping mechanism 11 which caps the orifice surface of the printhead 3, and a wiping mechanism 12 which cleans the orifice surface of the printhead 3. The recovery device 10 uses a suction unit (a suction pump or the like) included in itself to forcibly suck inks from the orifices in synchronism with capping the orifice surface by the capping mechanism 11. In this way, the recovery device 10 achieves a recovery process of, for example, removing inks with a high viscosity, bubbles, and the like in ink channels of the printhead 3.

During a non-printing operation (print waiting time) or the like, the capping mechanism 11 caps the orifice surface of the printhead 3 to protect the printhead 3 and to prevent evaporation and drying of inks. On the other hand, the wiping mechanism 12 is arranged in the vicinity of the capping mechanism 11 to wipe ink droplets attached to the orifice surface of the printhead 3. These capping mechanism 11 and wiping mechanism 12 can maintain a normal ink discharge state of the printhead 3. Note that the print waiting time includes such maintenance processing time, an ink dry waiting time upon continuously printing images on printing media of a plurality of pages, and the like.

Figure 16:
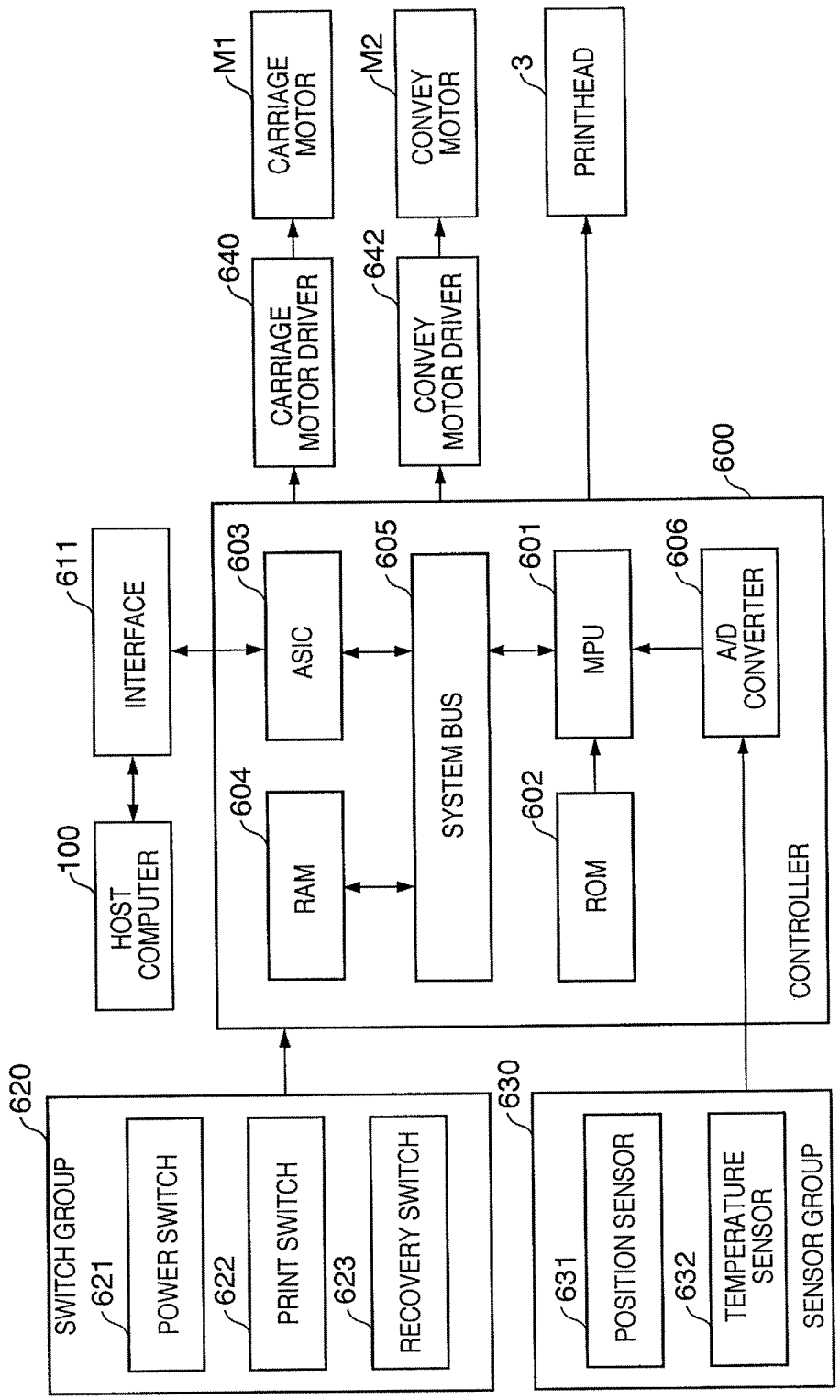
FIG. 16 is a block diagram showing the control arrangement of the ink-jet printing apparatus as a typical embodiment of the present invention.

FIG. 16 is a block diagram showing the control arrangement of the printing apparatus shown in FIG. 15.

As shown in FIG. 16, a controller 600 comprises an MPU 601, and a ROM 602 which stores a program corresponding to a control sequence (to be described later), predetermined tables, other fixed data, and the like. Also, the controller 600 comprises an application specific integrated circuit (ASIC) 603 which generates control signals for control of the carriage motor M1, that of the conveyance motor M2, and that of the printhead 3, and a RAM 604 which is used as an image data rasterizing area, a work area for executing a program, and the like. Furthermore, the controller 600 comprises a system bus 605 which interconnects the MPU 601, ASIC 603, and RAM 604 to exchange data, an A/D converter 606 which A/D-converts analog signals input from a sensor group (to be described later), and supplies digital signals to the MPU 601, and the like.

Referring to FIG. 16, reference numeral 100 denotes a host computer (including a reader, digital camera, and the like, which are used to read an image) which serves as a supply source of image data, and also as an image processing apparatus. The host computer 100 and printing apparatus exchange image data, commands, status signals, and the like via a plurality of interfaces (I/Fs) 611 of different transfer speeds.

Reference numeral 620 denotes a switch group, which includes a power switch 621, a print switch 622 used to input a print start instruction, a recovery switch 623 used to input an activation instruction of processing for maintaining the discharge performance of the printhead 3 in a satisfactory state (recovery processing), and the like. In this way, the switch group 620 includes the switches used to accept commands input by the operator. Reference numeral 630 denotes a sensor group which is used to detect the apparatus state, and includes a position sensor 631 such as a photocoupler for detecting the home position, a temperature sensor 632 arranged at a proper position of the printing apparatus to detect the ambient temperature, and the like.

Reference numeral 640 denotes a carriage motor driver for driving the carriage motor M1 used to reciprocally scan the carriage 2 in the directions of the arrow A; and 642, a conveyance motor driver for driving the conveyance motor M2 used to convey the printing medium P.

During printing and scanning of the printhead 3, the ASIC 603 transfers data for driving printing elements (electrothermal transducers) to the printhead while directly accessing the storage area of the RAM 604.

FIG. 1 is an exemplary block diagram showing the arrangement of the host computer 100 which generates image data to be transmitted to the ink-jet printing apparatus.

To the host computer 100, a printer 105 as the ink-jet printing apparatus and a monitor 106 are connected.

The host computer 100 has application software 101 including a wordprocessor, spreadsheet, Internet browser, and the like. Various drawing instructions (an image drawing instruction, text drawing instruction, and graphics drawing instruction) which are issued by the application software 101 and indicate an output image are input to a monitor driver 104 via an operating system (OS) 102. Upon execution of printing, these drawing instructions are also input to a printer driver 103 via the OS 102. The printer driver 103 is software which generates printing data by processing these drawing instructions, and controls the printer 105 to print an image based on the printing data. The monitor driver 104 is software which processes these drawing instructions, and controls the monitor 106 to display an image.

The host computer 100 comprises hardware components such as a CPU 108, hard disk (HD) 107, RAM 109, ROM 110, and the like so as to store the software and to make it function. Note that the host computer 100 shown in FIG. 1 may use a popular IBM AT-compatible personal computer, and the OS 102 may use Microsoft Windows® XP or the like. In one configuration, arbitrary application software 101 may be installed in such personal computer, and the monitor 106 and printer 105 may be connected.

In the host computer 100, the application software 101 generates output image data using text data such as characters and the like, graphics data such as figures and the like, picture data such as photo pictures and the like, and so forth. The monitor 106 displays the output image data. Upon printing an image based on the output image data, the application software 101 issues an output request to the OS 102. Then, the application software 101 issues, to the OS 102, drawing instructions including a text drawing instruction for a text data part, a graphics drawing instruction for a graphics data part, and an image drawing instruction for a picture data part.

FIG. 2 is an exemplary block diagram showing the arrangement of principal part required upon executing image processing.

As shown in FIG. 2, the OS 102 spools the drawing instructions, and accepts the output request from the application software 101. The OS 102 then issues a print request and the drawing instructions to the printer driver 103 corresponding to an output printer. When the printer 105 is a raster printer, the printer driver 103 rasterizes the output request and drawing instructions input from the OS 102, and sequentially stores raster data in band memories which have, for example, an 8-bit depth respectively for RGB. Note that the band memories are assured on, for example, the RAM 109. Upon transmitting CMYK data to the printer 105, a color processor A 200 converts the raster data defined by RGB data into CMYK data. After that, a quantizer 201 quantizes the CMYK data by halftone processing.

A compression unit 202 of the printer driver 103 compresses the raster data generated as described above. The printer driver 103 appends commands and the like required for processing of the printer 105 to the compressed data, and transmits that data to the printer 105.

The printer 105 receives the compressed data, and a decompression unit 203 decompresses the compressed data by the same method as the compression method of the compression unit 202. Next, a color processor B 204 applies various color processes to the decompressed raster data. When the raster data is defined by RGB data, it is converted into CMYK data. When the decompressed CMYK data or CMYK data converted from the decompressed RGB data is multi-valued data, a binarization unit 205 applies halftone processing to the CMYK multi-valued data, and sends binary data to a printer engine 206, thus printing an image.

Some embodiments of printing control methods commonly using an ink-jet printing apparatus having the same arrangement as the printer 105 will be described hereinafter.

(First Embodiment)

The sequence of image processing in the host computer 100 according to this embodiment, which is required to print an image using the ink-jet printing apparatus with the above arrangement will be described below with reference to FIG. 4.

FIG. 4 is a flowchart when the application software 101 on the host computer 100 according to this embodiment issues a printing execution instruction. More specifically, FIG. 4 is a flowchart showing the processing until the host computer 100 converts data obtained by rasterizing the drawing instructions stored in the band memories into a data format printable by the printer 105, and transmits the converted data to the printer 105.

Prior to outputting printing data to the ink-jet printing apparatus, the type of interface used to transfer a current print job is checked in step S110 to determine a transmission speed (transfer speed) of this interface. The transfer speed is determined using type information of the interface included in the print job and a transfer speed classification table shown in FIG. 5. In step S110, the transfer speed is classified based on the type of interface. For example, when the interface is USB, different transfer speeds are set depending on transfer modes. Hence, the transfer speeds may be classified in consideration of the transfer modes, as shown in FIG. 6.

If it is determined in step S110 that the interface used to transfer the current print job has a high transfer speed, the transfer time of printing data can be shortened if the printing data has a large size. Hence, a compression method of a low compression ratio (e.g., PackBits as lossless compression) is selected in step S120.

Figure 7:
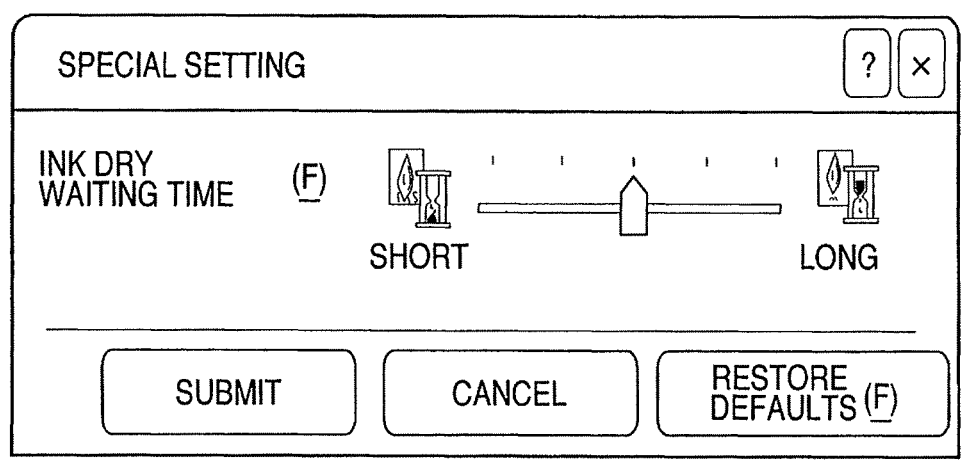
FIG. 7 shows an example of a display window used to set an ink dry waiting time.

If it is determined in step S110 that the interface used to transfer the current print job has a low transfer speed, a time required to dry inks printed on the immediately preceding page (ink dry waiting time) is acquired in step S140. This ink dry waiting time may assume a value set by displaying a display window shown in FIG. 7 by the printer driver 103 or it may be a value held by the printer 105 itself. In this embodiment, the ink dry waiting time is determined based on the setting on the display window shown in FIG. 7 in accordance with a correspondence table shown in FIG. 8.

The reception buffer size in the printer 105 is acquired in step S180, and information of a printing medium size in the current print job is acquired in step S190. After that, in step S200 a compression method is determined from a correspondence table shown in FIGS. 9 and 10 based on the pieces of information acquired in steps S140, S180, and S190. FIG. 9 shows a case in which the reception buffer size is less than a prescribed value, and FIG. 10 shows a case in which the reception buffer size is equal to or larger than the prescribed value. If the pieces of information correspond to "H" in FIGS. 9 and 10 in step S200, a compression method of a high compression ratio (e.g., JPEG (Joint Photographic Experts Group as lossy compression) is selected in step S210. On the other hand, if the pieces of information correspond to "L" in FIGS. 9 and 10 in step S200, a compression method of a low compression ratio (e.g., PackBits as lossless compression) is selected in step S220.

In step S230, compression processing is executed by the compression method decided in step S120, S210, or S220. In step S240, the compressed printing data is transmitted to the printer 105.

As the compression method decided in step S120, S210, or S220, not only either JPEG or PackBits is selected, but processing for determining a JPEG compression ratio may be used. More specifically, in step S120 or S220, a low compression ratio is set. In step S210, a high compression ratio is set. In step S230, JPEG compression is executed using the compression ratio designated in step S120, S210, or S220.

When both the lossless and lossy compression methods are available, and output of printing data is completed during the print waiting time irrespective of the compression method used, the lossless compression method is preferentially adopted to prevent deterioration of image quality. When the lossy compression method is adopted, deterioration of image quality can be eliminated by the compression method of a low compression ratio.

Figure 3A:
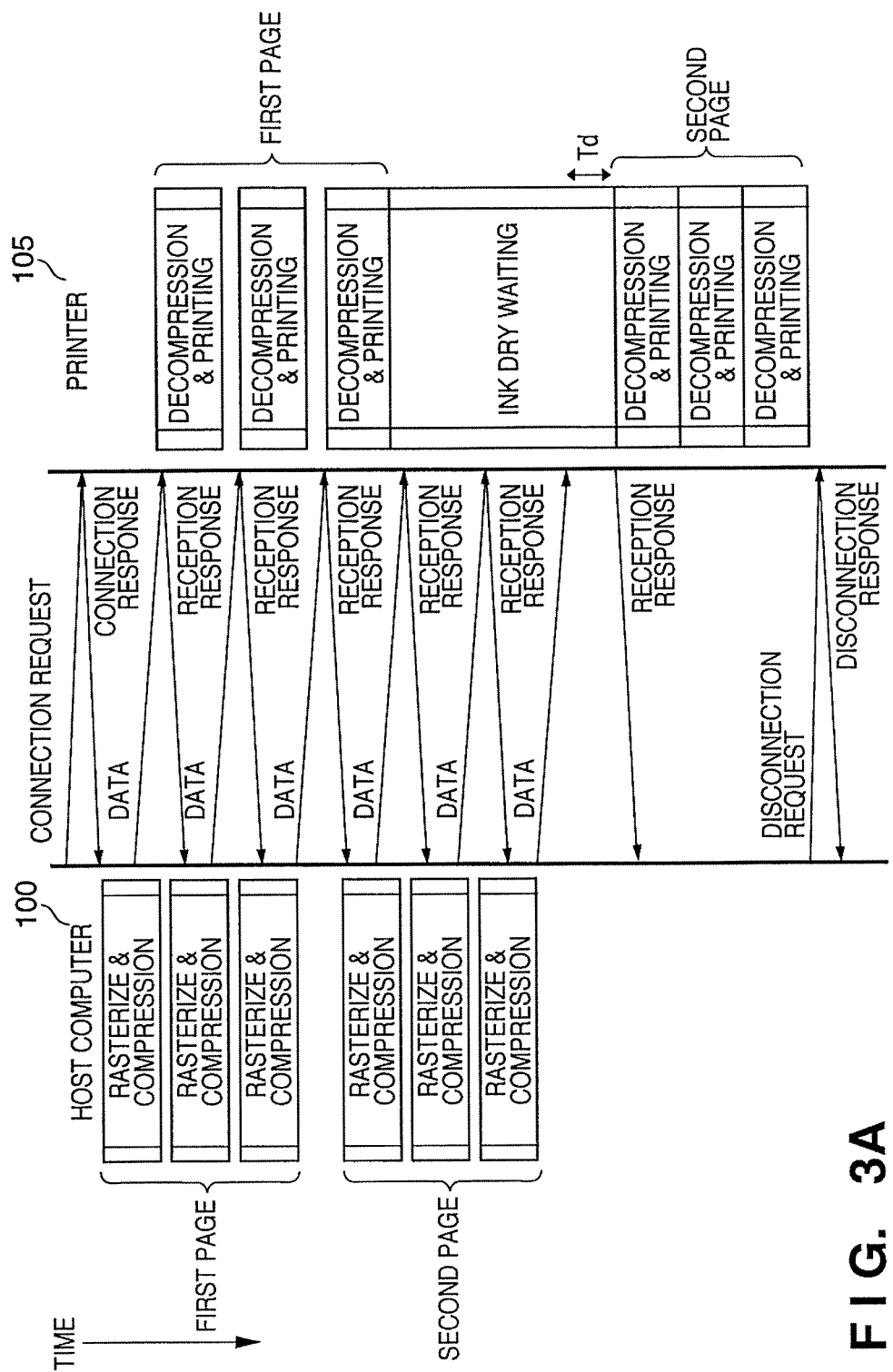
FIGS. 3A and 3B are time charts showing examples upon transmitting printing data during ink dry waiting.
Figure 3B:
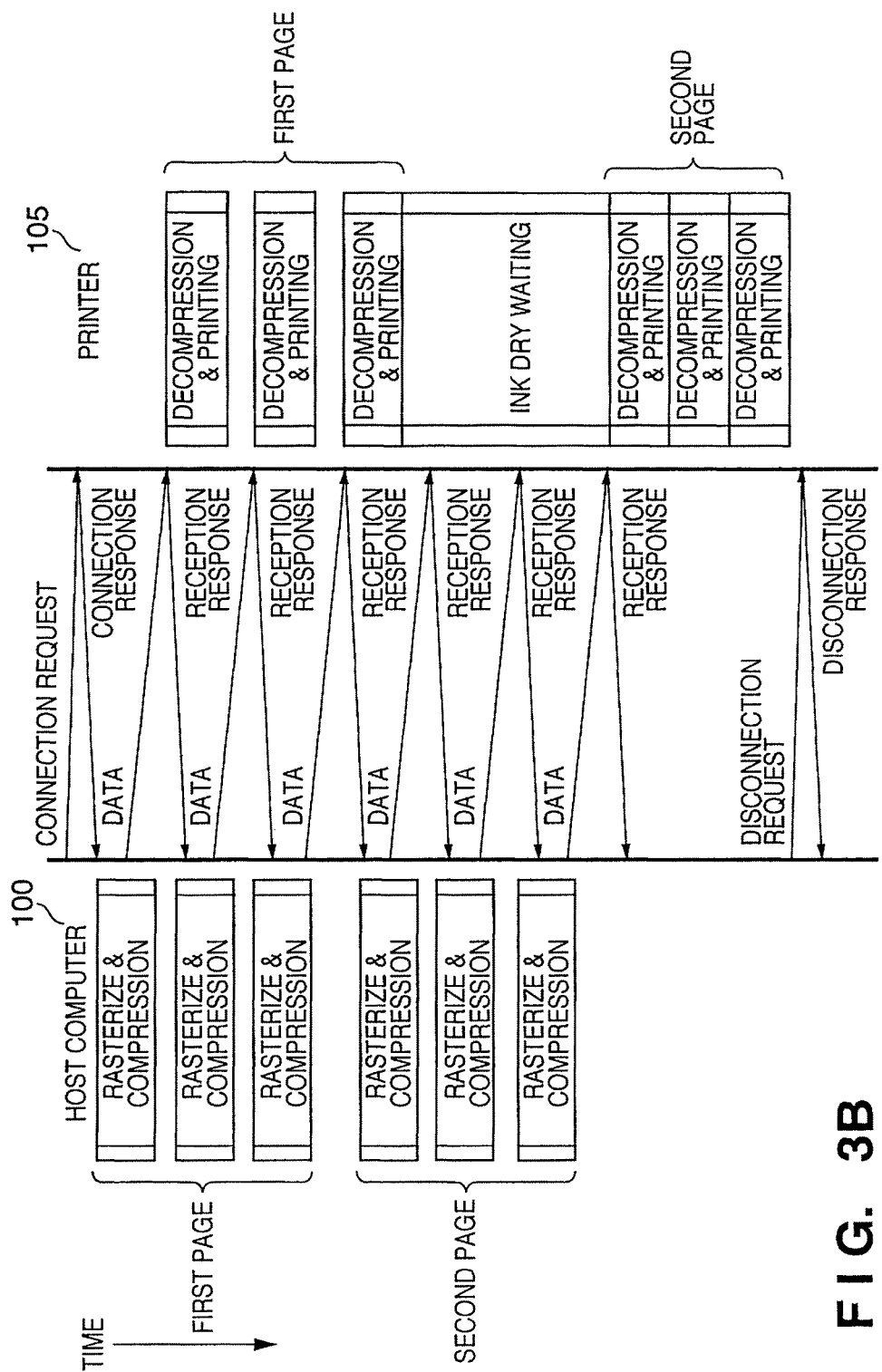

FIG. 3B is a time chart when the low-speed interface is used, and the compression method sets a low compression method. Compared to the compression method of a high compression ratio, the printing data size becomes large. For this reason, the transfer time required to transfer printing data from the host computer 100 to the printer 105 is prolonged. However, since the transfer of printing data of the second page is completed during the ink dry waiting processing, if the compression method of a low compression ratio is used, the processing time for the second and subsequent pages can be prevented from being increased.

(Second Embodiment)

In the aforementioned first embodiment, when the interface used to transfer a print job has a low transfer speed, the compression method of printing data is determined based on the ink dry waiting time, the reception buffer size in the printer 105, and printing medium size for all pages. In this embodiment, when the interface has a low transfer speed, the compression ratio of a high compression ratio is used for the first page upon continuously printing images on printing media of a plurality of pages, independently of the ink dry waiting time, the reception buffer size in the printer 105, and the printing medium size. With this control, a time required to start printing of the first page can be shortened. Such an example will be explained below.

Figure 11:
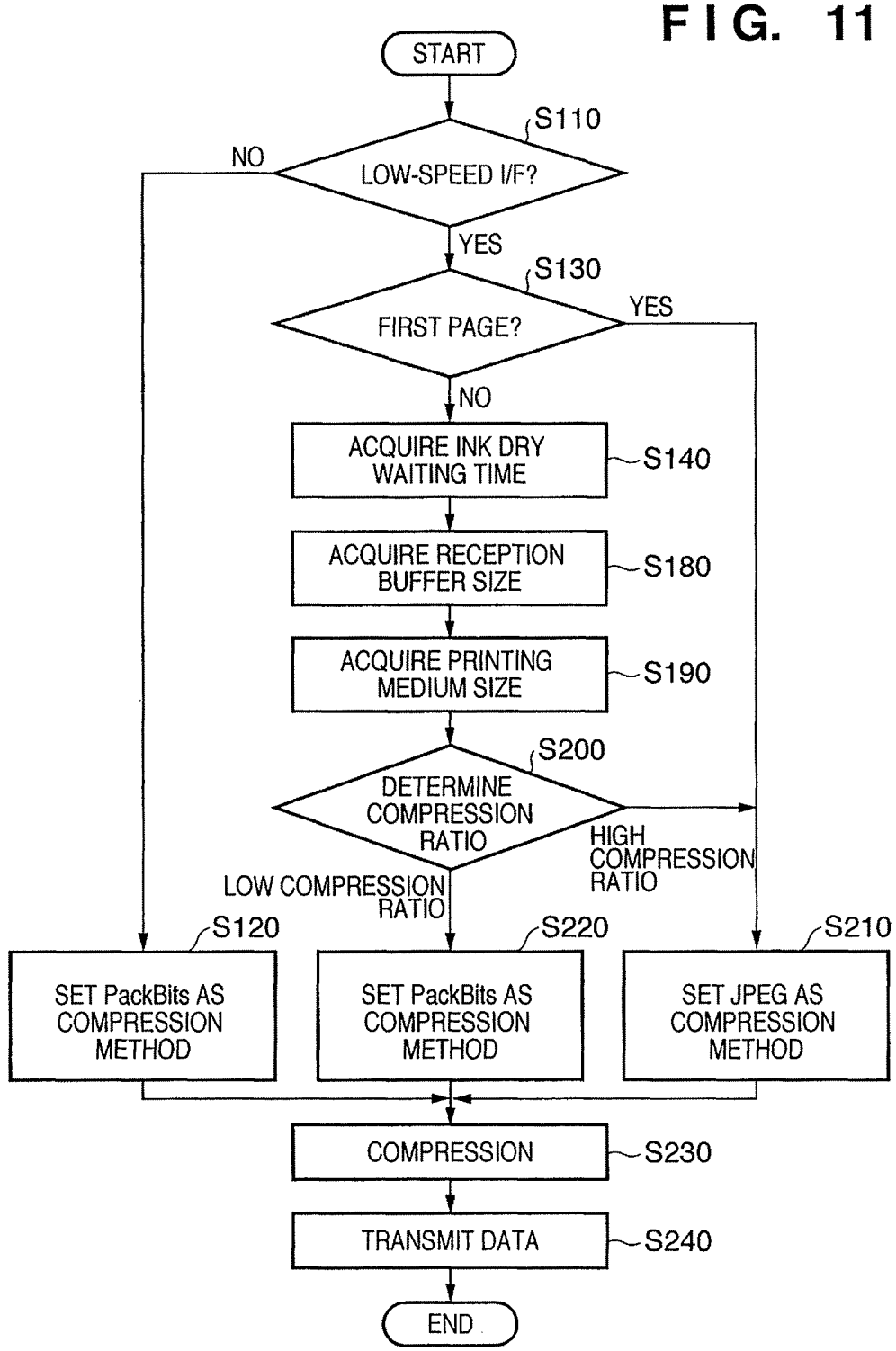
FIG. 11 is a flowchart showing image processing according to the second embodiment.

FIG. 11 is a flowchart when the application software 101 on the host computer 100 according to this embodiment issues a printing execution instruction. As in FIG. 4, FIG. 11 is a flowchart showing the processing until the host computer 100 converts data obtained by rasterizing the drawing instructions stored in the band memories into a data format printable by the printer 105, and transmits the converted data to the printer 105. Note that a detailed description of the steps common to FIG. 4 of the aforementioned first embodiment will not be repeated.

In step S110, the transfer speed of an interface used to transfer a current print job is checked. If it is determined that the interface used to transfer the current print job has a high transfer speed, a compression method of a low compression ratio (e.g., PackBits) is selected in step S120. On the other hand, if it is determined that the interface used to transfer the current print job has a low transfer speed, the flow advances to step S130.

It is checked in step S130 if the currently processed page is the first page. If it is determined in step S130 that the currently processed page is the first page, a compression method of a high compression ratio (e.g., JPEG) is selected in step S210 to shorten the transfer time of printing data for the first page. If it is determined in step S130 that the currently processed page is the second or subsequent page, the ink dry waiting time is acquired in step S140. The subsequent steps are common to those in FIG. 4 of the aforementioned first embodiment.

(Third Embodiment)

In the first and second embodiments described above, if an interface used to transfer a print job has a low transfer speed, the compression method of printing data is determined based on the ink dry waiting time, the reception buffer size of the printer 105, and the printing medium size. This embodiment will explain an example in which a printing operation halt time upon execution of a maintenance operation is considered.

The maintenance operation of the printer 105 during the printing operation includes, for example, a wiping operation for the printhead, and a preliminary discharge operation. As timer management variables used to decide the execution timing of the maintenance operation, a wiping timer Tw and the total number D of discharged dots are defined.

Determination processing as to whether or not to execute the maintenance operation will be described below with reference to FIG. 12.

Figure 12:
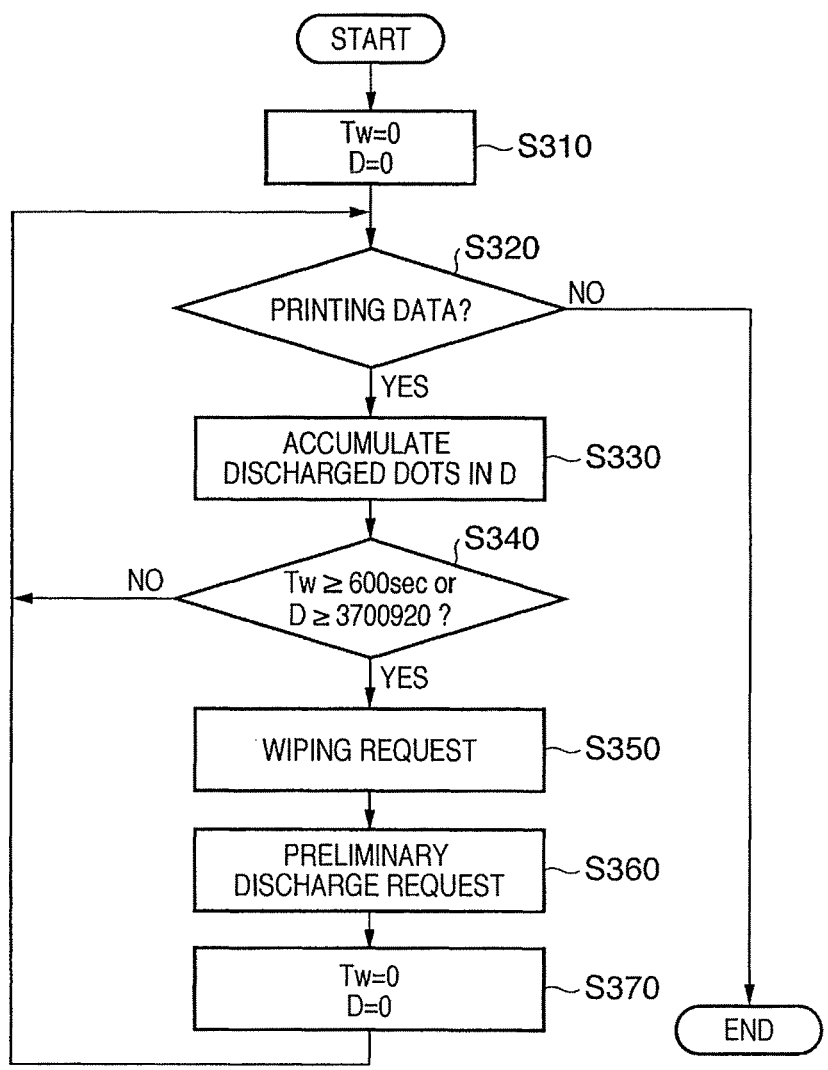
FIG. 12 is a flowchart showing maintenance operation determination processing according to the third embodiment.

FIG. 12 is a flowchart showing the determination processing of the maintenance operation in the printer 105. In step S310, the wiping timer Tw is cleared (Tw=0) to start counting. Also, the variable D that accumulates the number of ink dots discharged from the printhead is cleared (D=0).

In step S320, the presence/absence of printing data from the host computer 100 is determined. If it is determined in step S320 that printing data is absent, the determination processing as to whether or not to execute the maintenance operation ends. If it is determined in step S320 that printing data is present, the process advances to step S330, and the printer 105 prints an image on a printing medium by controlling the printhead based on that printing data. Also, the total number of ink dots discharged by printing at that time is accumulated in the variable D.

It is checked in step S340 if the wiping timer Tw is equal to or larger than a predetermined value (e.g., 600 sec) or the total number D of dots is equal to or larger than a predetermined value (e.g., 3700920). If it is determined that the wiping timer Tw is not equal to or larger than the predetermined value or the total number D of dots is not equal to or larger than the predetermined value, the process returns to step S320 without executing any maintenance operation. If it is determined that the wiping timer Tw is equal to or larger than the predetermined value or the total number D of dots is equal to or larger than the predetermined value, the printer 105 executes the maintenance operation in accordance with a wiping request (step S350) and preliminary discharge request (step S360). Also, when a maintenance operation request is accepted from the host computer 100, the printer 105 executes the maintenance operation. After completion of the maintenance operation, the wiping timer Tw and the total number D of dots are cleared in step S370, and the process returns to step S320.

Figure 13:
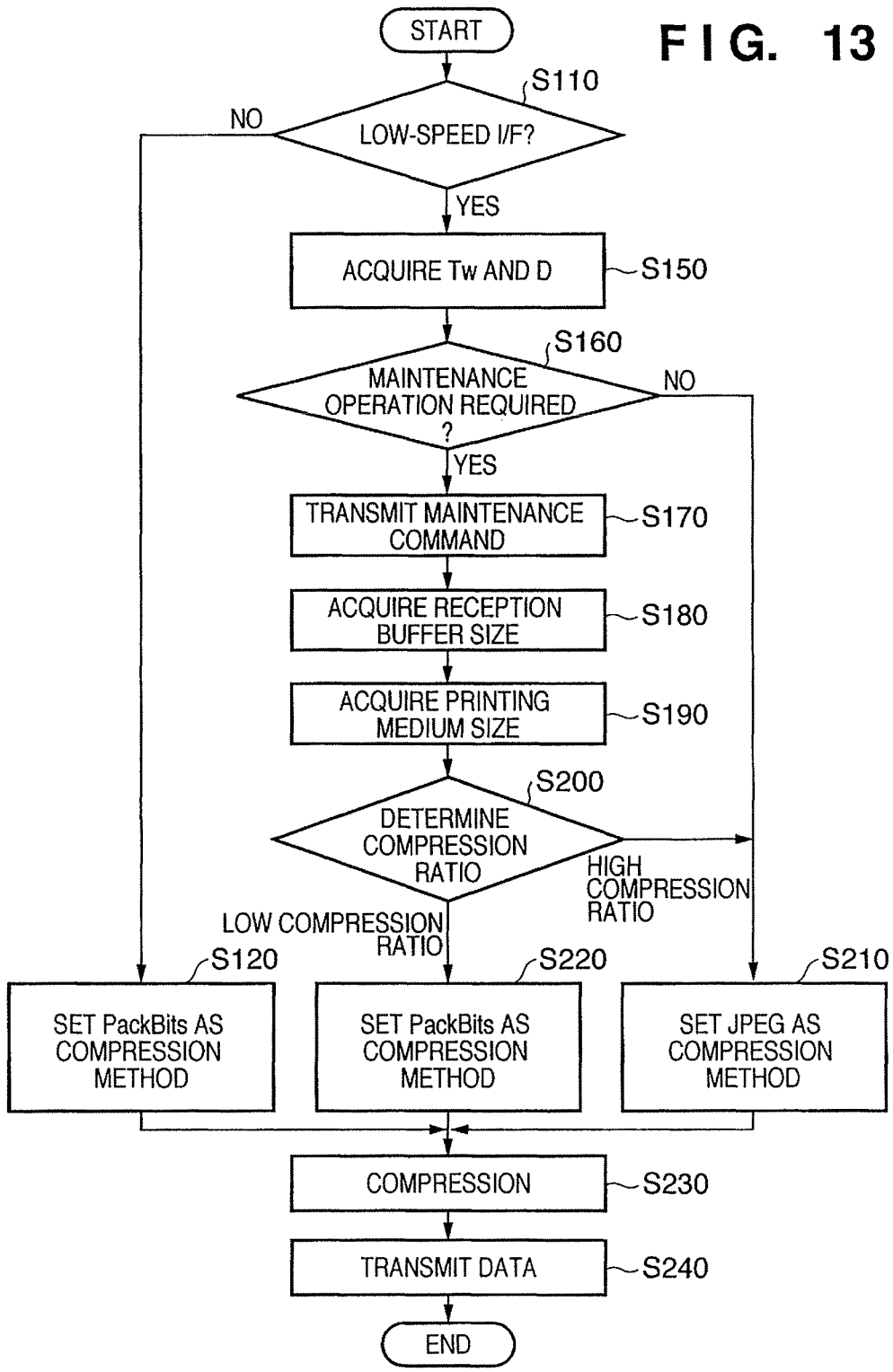
FIG. 13 is a flowchart showing image processing according to the third embodiment.

The sequence of processing for deciding the compression method of printing data in consideration of the maintenance operation in the printer 105 will be explained with reference to FIG. 13. FIG. 13 is a flowchart when the application software 101 on the host computer 100 according to this embodiment issues a printing execution instruction. As in FIGS. 4 and 11, FIG. 13 is a flowchart showing the processing until the host computer 100 converts data obtained by rasterizing the drawing instructions stored in the band memories into a data format printable by the printer 105, and transmits the converted data to the printer 105. Note that a detailed description of the steps common to FIG. 4 of the aforementioned first embodiment will not be repeated.

In step S110, the transfer speed of an interface used to transfer a current print job is checked. If it is determined that the interface used to transfer the current print job has a high transfer speed, a compression method of a low compression ratio (e.g., PackBits) is selected in step S120. On the other hand, if it is determined that the interface used to transfer the current print job has a low transfer speed, the flow advances to step S150.

In step S150, the wiping timer Tw and the total number D of dots managed by the printer 105 are acquired. It is then checked in step S160 based on a printing area of the current page, and the wiping timer Tw and the total number D of dots acquired in step S150 if the maintenance operation is required after printing of the current page. If it is determined in step S160 that the maintenance operation is not required, a compression method of a high compression ratio (e.g., JPEG) is selected in step S210. If it is determined in step S160 that the maintenance operation is required, a maintenance execution command is issued to the printer 105 in step S170. The reception buffer size is acquired in step S180, and printing medium information is acquired in step S190. The process then advances to step S200. In step S200, a compression method is determined from a correspondence table shown in FIG. 14 based on the pieces of information acquired in steps S180 and S190. If the pieces of information correspond to "H" in FIG. 14 in step S200, a compression method of a high compression ratio (e.g., JPEG) is selected in step S210. On the other hand, if the pieces of information correspond to "L" in FIG. 14 in step S200, a compression method of a low compression ratio (e.g., PackBits) is selected in step S220. The subsequent steps are common to those in FIG. 4 of the aforementioned first embodiment.

According to this embodiment, since the compression method of printing data is determined in consideration of the maintenance processing time of the ink-jet printing apparatus in the configuration using a low-speed interface, an output result with high image quality can be obtained without increasing the processing time required for printing.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by a software program that implements the function of the aforementioned embodiments. More specifically, such program includes that for making the computer or the like execute the determination processing of the interface type, the acquisition processing of a print waiting time, the determining processing of the compression method of printing data, the compression processing for compressing printing data, and the output processing of printing data.

The objects of the present invention are also achieved by supplying a storage medium which records the software program that implements the functions of the aforementioned embodiment to a system or apparatus, and reading out and executing the programs stored in that storage medium. In this case, the program itself read out from the storage medium implements the functions of the aforementioned embodiments, and the program and the storage medium that stores the program constitute the present invention. The functions of the aforementioned embodiments are implemented by executing the readout program by the computer. Also, the present invention includes a case in which an OS (operating system) running on the computer executes some or all of actual processing operations based on an instruction of the program code, thereby implementing the aforementioned embodiments.

Furthermore, the program read out from the storage medium is often written in a memory of an expansion card or a function expansion unit, which is inserted into or connected to the computer. In such case, a CPU or the like equipped on that function expansion card or unit executes some or all of actual processes, thereby implementing the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-119615, filed Apr. 27, 2007, which is hereby incorporated by reference herein in its entirety.

What is claimed is:

1. An image processing apparatus that is connected to a printing apparatus via an interface, the image processing apparatus comprising:
a processor coupled to a memory, cooperating to function as:
an interface determination unit that determines whether a type of an interface is a first type interface or a second type interface, wherein a transfer speed of the second type interface is slower than a transfer speed of the first type interface,
a waiting time determination unit that determines a print waiting time,
an acquisition unit that acquires setting information including a size of a printing medium on which printing data is printed,
a compression method determination unit that determines a compression method of the printing data, a compression unit that compresses the printing data by the compression method determined by the compression method determination unit, and an output unit that outputs the printing data compressed by the compression unit to the printing apparatus, wherein the compression method determination unit:

determines that the printing data is to be compressed by lossless compression as the compression method, when the interface determination unit determines that the type of the interface is the first type interface, and determines that the printing data is to be compressed by either lossless compression or lossy compression as the compression method based on the print waiting time determined by the waiting time determination unit and the setting information acquired by the acquisition unit, when the interface determination unit determines that the type of the interface is the second type interface.

2. The image processing apparatus according to claim 1, wherein the printing apparatus is an ink jet printing apparatus that prints an image by discharging ink from nozzles of a printhead to a printing medium, and the print waiting time is a time period for waiting until ink that is printed on an immediately preceding page of the printing data is dried before subsequent printing is performed by the ink-jet printing apparatus.

3. The image processing apparatus according to claim 2, wherein, when the printing apparatus continuously prints images on printing media corresponding to a plurality of pages of the printing data, the compression method determination unit determines that a beginning page that has no immediately preceding page of the printing data is to be compressed by lossy compression.

4. The image processing apparatus according to claim 1, wherein the printing apparatus is an ink jet printing apparatus that prints an image by discharging ink from nozzles of a printhead to a printing medium, and the print waiting time is a maintenance processing time including time for wiping the printhead and preliminarily discharging ink to the printhead of the printing apparatus.

5. The image processing apparatus according to claim 1, wherein the setting information acquired by the acquisition unit includes size information of a reception buffer of the printing apparatus, which receives the printing data from the image processing apparatus.

6. The image processing apparatus according to claim 1, wherein, when the compression method determination unit determines that both lossless compression and lossy compression are available, the compression method determination unit preferentially determines that the printing data is to be compressed by lossless compression.

7. The image processing apparatus according to claim 1, wherein, when the compression method determination unit determines that the printing data is to be compressed by lossy compression, the compression method determination unit further determines a compression rate.

8. The image processing apparatus according to claim 1, wherein the interface determination unit further determines a transfer speed of the interface based on the type of the interface.

9. The image processing apparatus according to claim 1, wherein the interface determination unit determines a transfer speed of the interface based on a transfer mode of the interface.

10. The image processing apparatus according to claim 1, wherein the waiting time determination unit determines the print waiting time by acquiring the print waiting time set in the printing apparatus.

11. The image processing apparatus according to claim 1, wherein the waiting time determination unit determines the print waiting time by acquiring the print waiting time set in the image processing apparatus.

12. An image processing method of an image processing apparatus that is connected to a printing apparatus via an interface, the method comprising steps of:

determining whether a type of an interface is a first type interface or a second type interface, wherein a transfer speed of the second type interface is slower than a transfer speed of the first type interface;

determining a print waiting time;

acquiring setting information including a size of a printing medium on which printing data is printed;

determining a compression method of the printing data;

compressing the printing data by the determined compression method; and outputting the printing data compressed in the compressing step to the printing apparatus, wherein the steps of determining the compression method of the printing data includes:

determining that the printing data is to be compressed by lossless compression as the compression method, when the type of the interface is determined to be the first type interface, and determining that the printing data is to be compressed by either lossless compression or lossy compression as the compression method based on the determined print waiting time and the acquired setting information, when the type of the interface is determined to be the second type interface.

13. A non-transitory computer-readable recording medium storing a program that when executed causes a computer to perform a method of an image processing apparatus, which is connected to a printing apparatus via an interface, the method comprising steps of:

determining whether a type of an interface is a first type interface or a second type interface, wherein a transfer speed of the second type interface is slower than a transfer speed of the first type interface;

determining a print waiting time;

acquiring setting information including a size of a printing medium on which printing data is printed; determining a compression method of the printing data;

compressing the printing data by the determined compression method; and outputting the printing data compressed in the compressing step to the printing apparatus, wherein the steps of determining the compression method of the printing data includes:

determining that the printing data is to be compressed by lossless compression as the compression method, when the type of the interface is determined to be the first type interface, and determining that the printing data is to be compressed by either lossless compression or lossy compression as the compression method based on the determined print waiting time and the acquired setting information, when the type of the interface is determined to be the second type interface.

* * * * *